(No Model.)
W. L. SCAIFE.
TUBE JOINT FOR GAS CONDUITS.
No. 330,624.  Patented Nov. 17, 1885.
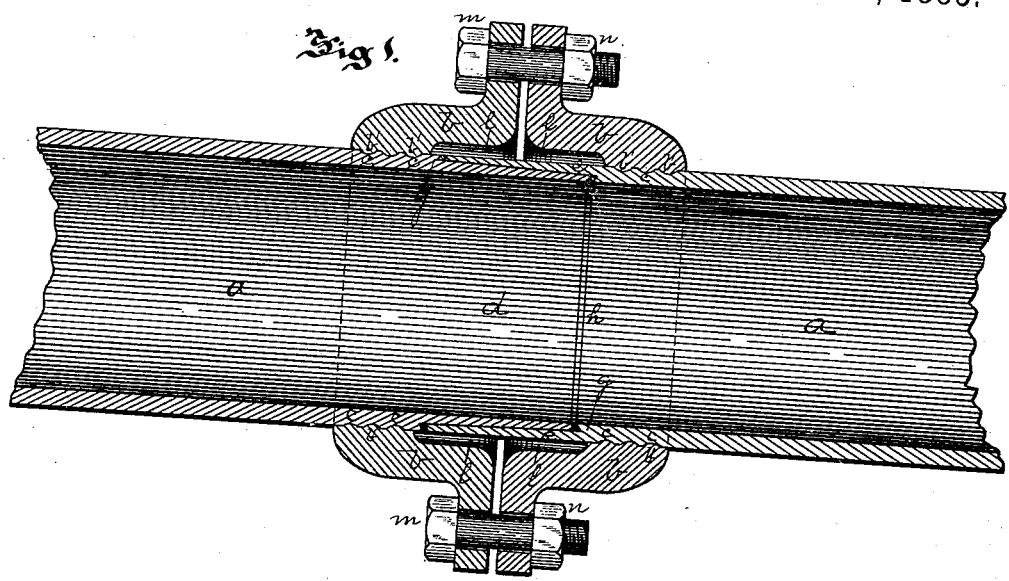
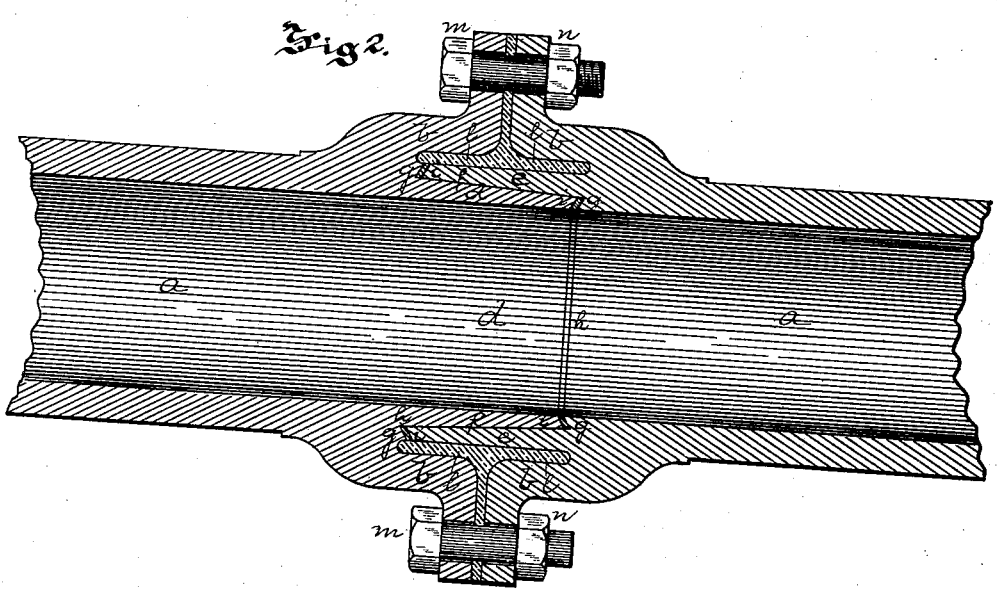
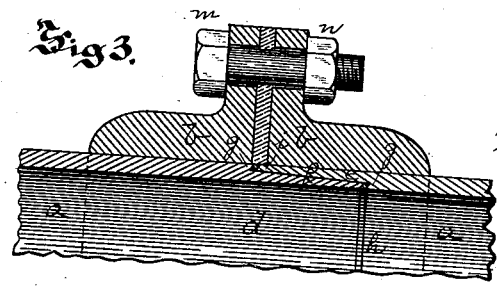

United States Patent Office.

W. LUCIEN SCAIFE, OF ALLEGHENY, PENNSYLVANIA.

TUBE-JOINT FOR GAS-CONDUITS.

SPECIFICATION forming part of Letters Patent No. 330,624, dated November 17, 1885.

Application filed May 2, 1885. Serial No. 164,162. (No model.)

*To all whom it may concern:*

Be it known that I, W. LUCIEN SCAIFE, of Allegheny City, in the county of Allegheny and State of Pennsylvania, have invented a new and useful Improvement in Tube-Joints for Gas-Conduits; and I do hereby declare the following to be a full, clear, and exact description thereof.

My invention relates to joints for pipes or tubing, its object being to provide an absolutely tight joint specially adapted for that class of tubing in which natural or other gas is carried under high pressure. In the conduits heretofore employed for natural gas great difficulty has been experienced by reason of the opening of the joint after the line of pipe was laid, on account of the strains brought upon the tube sections and joints from different causes, the principal cause of such strains being the expansion and contraction of the tubing on account of the varying pressure and varying temperature of the gas passing through the conduit, these strains arising to a great extent on account of the low temperature of the natural gas, which would cause the contraction of the line of tubing, and so occasion great longitudinal strain upon special joints in the conduit and cause the stripping of the threads. The tubing was also subjected to transverse strains in many cases, such as where it extends across the bottoms of creeks or rivers, and where slight curves or bends were made in the trench within which the tubing was laid.

The object of my invention is to provide a joint which is strong, rigid, and tight, the joint proper being held sufficiently to overcome the longitudinal strain occasioned by expansion and contraction and prevent the opening of the joint between the two sections of the tubing.

It consists, essentially, in a tube-joint formed of wrought-metal tubing having cast-metal flanges cast around the body of the tubing, and provided with suitable means for connecting these flanges.

It also consists in forming at the ends of the tube-sections to be joined sleeves adapted to fit one within the other, these sleeves having tapering external and internal faces turned so as to coincide and form a tight joint when firmly pressed the one within the other, and connecting the tube-sections by flange-joints or similar means.

It also consists in providing the tube-sections to be joined with shoulders at the base of these sleeves, and packing on the shoulders to insure a tight joint when they are pressed firmly the one within the other.

It also consists in forming around the body of the tubing at the joint and within the flanges by which they are connected an annular space to receive lead or other suitable calking material, this calking material surrounding the tubing and extending out between the faces of the flanges to arrange for calking the same.

To enable others skilled in the art to make and use my improved tube-joint, I will describe the same more fully, referring to the accompanying drawings, in which—

Figure 1 is a longitudinal central section of the tube-joint when employed with wrought-metal tubing. Fig. 2 is a like view of the same when employed with cast-metal tubing, and Fig. 3 is a like view of a portion of the joint illustrating another form thereof.

Like letters of reference indicate like parts in each.

The tube-sections *a a* are formed of any suitable length, the usual length of these tube-sections being from sixteen to eighteen feet. Where the tube-sections are formed of wrought-metal tubing, the flanges *b* are cast around the same at or near the ends of the tube-sections; but where the joint is made of cast-metal tubing these flanges are cast with the body of the tubing.

In conveying this gas it is preferable to employ wrought-metal tubing, and in order to obtain a strong and rigid connection between the two tube-sections the flanges *b b* are made of cast metal, and are heavy, strong, and rigid, and these flanges are cast around the body of the wrought-metal tubing, the end of the wrought-metal tubing being inserted within the mold, and the cast-metal flanges being cast thereto in ways well known to the skilled founder, the cast metal shrinking and binding firmly upon the body of the wrought-metal tubing, and forming an exceedingly strong and tight joint therewith.

In order to insure a strong connection between the wrought-metal tubing and the cast-metal flange against longitudinal strain, I prefer to form around the body of the wrought-metal tubing annular depressions c, within which the molten metal enters, and so form annular rings, as at b', which hold firmly against such longitudinal strain, though these rings and depressions are not absolutely necessary, it being found that an exceedingly tight joint is formed by casting the flanges upon the wrought-metal tubing, the wrought metal fusing slightly the outer surface of the tubing, and holding thereto in this manner, as well as by the contraction of the body of the flange around the tubing. At the ends of the tube-sections are formed sleeves d e, the sleeve d entering within the sleeve e, and the coinciding faces of these sleeves are accurately turned to the suitable taper and finish, so that they bear against each other along their entire faces when pressed firmly together. These tapering faces f are formed in the wrought-metal tubing by turning off he external and internal faces of the tubing in such manner as to leave the inner diameter of the male sleeve d and the outer diameter of the female sleeve e the same as the original internal and external diameters of the body of the tubing, the tapering face of the sleeve being thus turned within the body of the ordinary tubing. These tapering faces may extend upon a regular taper down to the edges of the tube; but I prefer to form shoulders or seats g, against which the ends of the sleeves abut, these seats extending into the body of the tubing at an acute angle, as shown clearly in Fig. 2, and the ends of the sleeves being turned to coincide therewith, and forming shoulders i, pressing against these seats, so that the ends of the sleeves enter within these seats and are held thereby in true line. The ends i of the sleeves may abut directly against these seats g; but I prefer to employ suitable packing-rings, h, resting on these seats, so as to provide an additional protection in the packing at the ends of the tapering sleeves. As these annular seats g extend at an acute angle into the body of the tubing, it is evident that where the sleeves are pressed the one within the other the pressure of the shoulders i at the ends of the sleeves against the packing-rings will press them firmly into their seats, so preventing the packing-ring at the base of the female sleeve from being pressed out into the tubing and obstructing the flow of the gas through the same. Where these shoulders and seats g i are employed, the faces f of the sleeves d e may, if desired, be formed straight; but I prefer the tapering faces, as shown. It is preferable to cast the flanges b around the body of the tubing beyond these sleeves d e, as the metal is stronger beyond these sleeves, and the annular depressions c can be formed on the body of the tubing, though the flanges may be formed as shown in Fig. 3, where one flange extends over the body of the female sleeve. Where the flanges are cast to the body of the tube beyond these sleeves, as shown in Figs. 1 and 2, I also form between the body of the tubing and the flanges the annular space l, for the reception of lead, cement, or other calking material, so that after the joint is formed the lead can be poured into this calking-space l, and extend up between the faces of the flanges, and thus provide means for calking the lead within the lead-space l and between the faces of the flanges. The flanges are connected together by any suitable means, that shown in the drawings being by a series of bolts, m, and nuts n, extending through suitable bolt-holes in the faces of the flanges. Where the joint is employed with cast-metal tubing, as shown in Fig. 2, the construction is substantially the same, the shoulders g being larger on account of the increased thickness of the tubing.

In connecting the tube-sections by my improved joint the packing-rings h are inserted in their seats g, at the bases of the sleeves d e, and the one sleeve d inserted within the sleeve e, the bolts passed through the bolt-holes of the flanges, and the two flanges drawn together by means of the nuts, the workmen drawing the joint firmly together, so that the faces f of the sleeves are pressed with great force against each other, and as they are turned to coincide they form a tight joint, metal to metal, for their entire length, this form of joint being much tighter than where filling materials are employed between the faces of the parts to be joined. As the two sleeves are thus drawn together the packing h is compressed between the shoulders i and seats g, and forms tight joints at the ends of the sleeves, thus further insuring the formation of a perfectly tight joint for the tubing. The joint may be employed without the surrounding calking material, and I have obtained exceedingly good results from its use in this manner; but as it is found of great importance to arrange for the calking of these joints for gas-conduits I consider it better to employ the lead or other calking around the joints formed. In such cases the joint is not drawn quite up to its final position, as it is desirable to compress the filling within the filling-space l and between the flanges, to take up any shrinkage of the lead. The lead is poured between the flanges in the ordinary manner, a suitable tool placed around the edges of the flanges, and the lead being poured at the top, and as soon as it is set the workman then draws the flanges up to their final position, and in so doing he at the same time compresses the lead within the lead-space l and between the flange-faces, and so compacts it as to prevent any leakage whatever. As an additional precaution the lead can be compressed by a calking-tool at the circumference of the flange. When the joint is in use, the gas passing through the conduit presses against the inner sleeve, d, so that any heavy pressure coming against the inner sleeve will, especially in wrought-metal tubing, where the body of the tubing is reduced in thickness, as before described, press this inner sleeve, *d*, against the outer sleeve, *e*, and so act further to form a tight joint between the sleeves held together by the flanges. Even where the body of the tubing is rigid, however, an absolutely tight joint is obtained, as the gas must first pass beyond the gasket *h*, thence between the coinciding faces *f* of the sleeves, and thence beyond the gasket on the outer face of the tubing before it can escape even between the sleeves, and its escape is still further prevented by the surrounding lead calking. It has been found by practical tests that this joint will stand a longitudinal and circumferential pressure of at least one thousand pounds per square inch of internal section pipe, without causing any appreciable longitudinal movement of the joint, and as the strain caused by the contraction and expansion on the line of tubing is in practice much less than this, it is evident that the joint has sufficient strength to overcome this force of expansion and contraction and hold the joint tight during any variation of temperature or pressure within the pipe, so that the joint cannot be affected by contraction or expansion. As the faces of these sleeves have a broad bearing upon each other, and the parts are held sufficiently together by the flanges, it is evident that the joints will not be affected by any lateral or transverse strain.

I am aware that pipe-joints have been made in which one part was provided with a socket, into which the spigot end of the pipe entered, the faces of these parts being in some cases tapering to guide them to place, and suitable packing being employed between the pipes, dependence being placed, in all these joints, on the packing to secure a tight joint. In my improved joint, however, the tight joint is obtained by the pressure of the tapering turned faces of the sleeves, one within the other, metal to metal, these faces being turned so as to coincide exactly, and being forced together with such heavy pressure as to preclude the escape of the gases through the joint formed, the packing between the edges of the joints being simply employed for additional security.

What I claim as my invention, and desire to secure by Letters Patent, is—

1. In combination with wrought-metal tubing, cast-metal flanges cast thereon at or near the ends, and suitable devices for connecting the pipes, substantially as set forth.

2. In tube-joints, the combination, with wrought-metal tubing having depressions *c* at or near the ends thereof, of cast-metal flanges *b*, cast to said tubing around the portion where these depressions are formed, substantially as and for the purposes set forth.

3. In tube-joints, the combination of sleeves formed at the ends of the tube-sections and fitting the one within the other, said sleeves having tapering turned coinciding faces, and suitable means for connecting the ends of the tubing.

4. In tube-joints, the combination of sleeves at the ends of the tube-sections, fitting one within the other, said sleeves having tapering turned coinciding faces and shoulders, forming slots at the bases of the sleeves, packing-rings confined between said seats and the ends of the sleeves, and suitable means for connecting the ends of the tubing.

5. In tube-joints, in combination with the tube-sections having the sleeves at the ends thereof fitting one within the other, the flanges *b* around the sleeves having annular depressions forming the annular filling-space *l* between the body of the tube-sections and the flanges, substantially as and for the purposes set forth.

In testimony whereof I, the said W. LUCIEN SCAIFE, have hereunto set my hand.

W. LUCIEN SCAIFE.

Witnesses:
JAMES I. KAY,
JAS. N. COOKE.